United States Patent [19]

Walsh

[11] Patent Number: 5,790,585

[45] Date of Patent: Aug. 4, 1998

[54] GRATING COUPLING FREE ELECTRON LASER APPARATUS AND METHOD

[75] Inventor: John E. Walsh, Bradford, Vt.

[73] Assignee: The Trustees of Dartmouth College, Hanover, N.H.

[21] Appl. No.: 745,510

[22] Filed: Nov. 12, 1996

[51] Int. Cl.$^6$ .................................................. H01S 3/08
[52] U.S. Cl. ............................ 372/102; 372/2; 372/74
[58] Field of Search ............................ 372/2, 74, 102

[56] References Cited

U.S. PATENT DOCUMENTS

| | | | |
|---|---|---|---|
| 2,634,372 | 4/1953 | Salisbury | 250/36 |
| 5,263,043 | 11/1993 | Walsh | 372/2 |
| 5,268,693 | 12/1993 | Walsh | 372/74 |
| 5,663,971 | 9/1997 | Carlsten | 372/2 |

OTHER PUBLICATIONS

Doucas,G. et al. (1992) "First Observation of Smith–Purcell Radiation from Relativistic Electrons" *Phys. Rev. Lett.* 69(12):1761–1764 Sep. 1992.

Goldstein, M. (1994) "A Far-Infrared Smith–Purcell Micro-Radiator" Ph.D. Thesis, Dartmouth College Oct. 1994.

Smith, S.J. and Purcell, E. M. (1953) "Visible Light from Localized Surface Charges Moving Across a Grating" *Phys. Rev.* 92:1069 (no month of publication).

Stoner, R.E. (1994) "Radiation from Relativistic Beams in Periodic Structures" Ph.D. Thesis, M.I.T. 1994.

Van den Berg, P.M. and Tan, T. H. (1974) "Smith–Purcell radiation from a line charge moving parallel to a reflection grating with rectangular profile". *J. Opt. Soc. of Am.* 64(3):325–328, Mar. 1974.

*Primary Examiner*—Brian Healy
*Assistant Examiner*—Robert E. Wise
*Attorney, Agent, or Firm*—Lahive & Cockfield, LLP

[57] ABSTRACT

Free electron laser apparatus, for producing coherent electromagnetic radiation within a spectral range extending from millimeter to visible wavelengths, includes elements for generating an electron beam and for directing the beam to move over the surface of a diffraction grating, thereby producing electromagnetic radiation. Optical or quasi-optical elements confine the electromagnetic radiation, including bound surface mode radiation, to generate feedback, resulting in stimulated, coherent emission. Methods are disclosed for increasing the electron beam current above a certain value so as to provide sufficient feedback of the electromagnetic radiation for producing stimulated, coherent emission.

22 Claims, 7 Drawing Sheets

GRATING COUPLING FREE ELECTRON LASER APPARATUS AND METHOD

BACKGROUND OF THE INVENTION

This invention relates generally to apparatus and methods for generating coherent electromagnetic radiation. More particularly, it relates to free electron lasers (FEL) for generating coherent radiation over a range of wavelengths, including far infra-red (FIR) and submillimeter regions, that is, wavelengths of about 10 µm to about 1000 µm.

The importance of a versatile and convenient FIR submillimeter source is a direct consequence of the large range of research opportunities and technical applications associated with this spectral region. Examples of such opportunities are found in spectroscopy and in other areas of technology development.

Spectroscopy applications include surface science, condensed-matter phenomena, excitations in high critical temperature superconductors, laser chemistry, radio astronomy, diagnostics in thermonuclear plasmas, conformational excitations in biomolecules, and gas phase spectroscopy. Technology development activities include submillimeter radar, radar modeling, countermeasures for FIR systems, space communications, compact high-gradient accelerator research, plasma heating, and isotope separation.

In view of the importance of this spectral range, considerable effort has been expended in developing new sources. Increased source power automatically provides greater signal-to-noise ratio, and, if stability is adequate, better resolution. Thus, recent years have seen new additions to the class of FIR submillimeter sources, including microwave tubes, impatt diodes, gyrotrons, FIR lasers, FELS, and Smith-Purcell devices.

Microwave Tubes

Conventional microwave tubes such as the magnetron, the klystron and the traveling-wave tube amplifier are widely used for moderate and high-power applications in the centimeter-wavelength region. However, most of these designs encounter fundamental limitations in operation at shorter wavelengths, particularly in the sub-millimeter regime.

Impatt Diodes

Impatt diodes can be used to produce low levels of power in the submillimeter regime. However, these systems are usually delicate and difficult to use. Furthermore, the power is extremely low—typically less than one milliwatt—and it may not be possible to extend their operation into the FIR regime.

Gyrotrons

The gyrotron is a relatively new entry to the coherent source population that can provide high power in certain frequency ranges. Again, however, as the operating wavelength approaches one millimeter, gyrotrons encounter fundamental limitations, and it is not yet clear whether operation at submillimeter to FIR wavelength is possible.

FIR Lasers

The FIR laser is a widely-used FIR source, in part because it can provide high levels of pulsed power. The optically pumped FIR laser, however, lacks tunability. In applications where tunability is required, the OP-FIR laser is of use only in rare instances of a near-coincidence of wavelength.

Free-Electron Lasers

Conventional free-electron lasers employ a spatially-periodic magnetic field, or undulator, to couple a highly-relativistic electron beam to the electromagnetic field. Tuning the wavelength of these devices is not straightforward. At high beam energy, substantial accelerator realignment is required. Moreover, extension of conventional FELs to longer wavelengths with the highly energetic beam drive is problematic, requiring a long period and thus a long-interaction-length undulator. This is expensive and cumbersome. Electrostatic accelerator-driven FEL's also operate in the submillimeter/FIR region. However, these devices are large and expensive, and are available only as a user-facility-based source.

Smith-Purcell Lasers

Certain researchers have suggested, in general terms, that a useful oscillator might be produced by adding feedback elements to beam/grating configurations demonstrated by Smith and Purcell. In 1953, Smith and Purcell generated incoherent radiation at visible wavelengths by using a finely-focused electron beam propagating over a metal grating at grazing incidence, as schematically depicted in FIG. 1. U.S. Pat. No. 2,634,372 of Salisbury, issued 7 Apr. 1953, also describes such an emission process.

Early research efforts in this area were devoted to determining the spectral content of the radiation produced by the configuration exemplified by FIG. 1. With reference to FIG. 1, the equation below expresses the theoretically-predicted relationship between the wavelength of the emitted radiation $\lambda$, the grating period P, the relative electron velocity $\beta$, and the angle of emission $\Theta_{SP}$:

$$\lambda = P(1/\beta - \sin \Theta_{SP})$$

The validity of this equation was verified in the first Smith-Purcell experiments, and reconfirmed in a number of subsequent works. Subsequent researchers noted the relation between this radiation and specular reflection from a grating.

However, in experiments demonstrating the process described above, referred to as the Smith-Purcell effect, optical feedback elements are not employed, and beam current densities typically are insufficient to produce significant amplification of the spontaneous emission. As a result, the incoherent or spontaneous component of the emission is dominant, and the illustrated configuration is not applicable as a coherent radiation source.

The underlying similarity between gratings and other periodic structures employed as coupling elements in microwave tubes, such as coupled cavities or helices, prompted researchers to suggest, in general terms, that feedback elements might be added to the beam/grating combination to produce an oscillator. Such configurations are sometimes referred to as Smith-Purcell lasers. However, little attention has been given to the optical design requirements for achieving a critical coupling strength for oscillation and an acceptable level of output power.

Walsh et al., in U.S. Pat. No. 5,268,693, have examined a resonator structure formed by a parallel plate waveguide having open sides and axial terminations. In this configuration, referred to as a planar Orotron, the terminations are cylindrical section mirrors having beam entrance and exit apertures. A narrow strip grating embedded along the axis of the structure couples the electron beam traversing the axis with the electromagnetic modes of the resonator. The radiation output is coaxial with the beam. The planar geometry of this planar Orotron resonator enables phase shifts per period other than $n(\pi)$ to be effectively employed.

The sources described above, however, have deficiencies that restrict their utility as FIR and submillimeter sources. Conventional microwave tubes, impatt diodes, gyrotrons, and FIR lasers, for example, fail to provide acceptable power output at the frequency ranges of interest. Conventional FEL are large, cumbersome, and expensive; and typical electron beam/grating arrangements do not achieve a critical coupling strength and useful level of output power.

It is accordingly an object of the invention to provide improved free electron laser methods and apparatus that are capable of operating as sources of coherent electromagnetic radiation in the FIR and submillimeter range.

Another object of the invention is to provide tunable FEL devices and operating methods that are capable of generating coherent radiation over a wide range of wavelengths, including operation in the sub-millimeter and far infrared spectral region.

It is a further object of the invention to provide FEL operating techniques and apparatus that enhance the stimulated, and hence coherent, component of the emitted radiation.

Another object of the invention is to provide FEL devices that are compact in size, produce substantial output power, and have enhanced frequency stability.

Other general and specific objects of the invention will in part be obvious and will in part appear hereinafter.

SUMMARY OF THE INVENTION

The invention attains the foregoing objects and thereby provides FEL methods and apparatus for producing coherent electromagnetic radiation in a spectral range which extends from millimeter to visible wavelengths. The FEL apparatus includes elements for generating an electron beam and for directing the beam to propagate over the surface of a diffraction grating. In accord with the invention, optical or grating means provide distributed feedback of the radiation generated by the electron beam—grating interaction.

In one aspect of the invention, the FEL utilizes a planar section open grating, as a single element resonator. In another aspect of the invention, the diffraction grating includes a planar section open grating and the distributed feedback is assisted by first and second opposing mirrors, substantially aligned along a common axis, the common axis being substantially parallel to the electron beam.

The invention is next described in connection with certain illustrated embodiments; and, it will be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference is to be made to the following detailed description and the accompanying drawings, in which.

DESCRIPTION OF ILLUSTRATED EMBODIMENTS

Theory of GCO Operation

The physical principles governing conventional periodic coupling structures also control the interaction of the electron beam and the electromagnetic fields in GCO devices constructed in accord with the invention. Thus, understanding of the embodiments depicted in FIGS. 2–8 may be obtained by reference to the conventional diffraction grating structure depicted in FIG. 1.

The following symbols are used in connection with FIGS. 1–8:

The Beam:

| | |
|---|---|
| $V_b$ | Beam voltage |
| $I_b$ | Beam current |
| $J_b$ | Beam current density |
| $\beta$ | The velocity of a beam electron relative to the speed of light (c) |
| $Y - 1$ | The relative kinetic energy of a beam electron $\{Y = (1-\beta^2)^{-5}; Y-1 = eV_b/mc^2$ $e$ = the electron charge, mc is the electron mass, c is the speed of light$\}$ |
| $S_{bx}$ | Beam thickness in the direction normal to the grating |
| $S_{by}$ | Beam width across the grating |
| $\delta$ | Gap between the beam and the grating surface |

The Grating:

| | |
|---|---|
| P | The grating period |
| d | The modulation depth of the grating |
| s | The slot width in a rectangular profile grating |
| $2\Theta$ | The opening angle of a triangular profile grating |
| $\Theta_{1,2}$ | The opening angles for a blazed grating |
| $\Theta_b$ | The blaze angle of a blazed grating |
| L | The interaction length for the beam on the grating |

The Electromagnetic Field

| | |
|---|---|
| $\omega$ | The angular frequency of an electromagnetic normal mode on the grating |
| m | The Floquet zone index number $\{(\text{infinity}) \leq m \leq (\text{infinity})\}$ |
| $K_o$ | The axial wave number in the principle (m = 0) zone |
| $K_m$ | The axial wave number of the mth space harmonic (SH)m $(K_m = K_o + 2m(\pi)/P)$ |
| $q_m$ | The transverse wave number in the direction normal to the grating $(q_m^2 = K_m^2 - \omega^2/c_2)$ |
| D | Symbol of the dispersion function; D = 0 is the dispersion relation |

Figure 1:
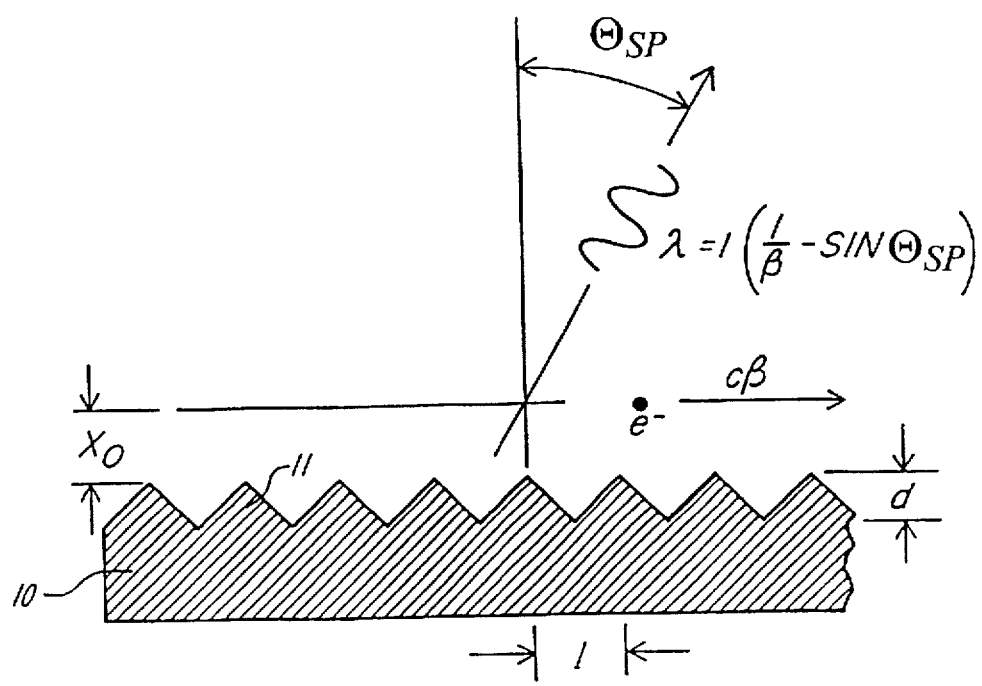
FIG. 1 depicts a Smith-Purcell configuration.

Referring to FIG. 1, in a conventional Smith-Purcell beam/grating experiment, an electron $(e^-)$, located at a height $x_o$ above a grating 10, is moving parallel to the surface 11. Importantly, the electron moves with a velocity $c\beta$. The coupling between the electron and the grating surface 11 produces a spontaneous emission spectrum where the wavelength of the emitted radiation, the grating period, the electron velocity, and the angle of emission, are related by where $\lambda$ is wavelength, P is grating period, $\beta$ is electron velocity relative to the speed of light, and $\Theta_{Sp}$ is the angle of emission.

Figure 2:
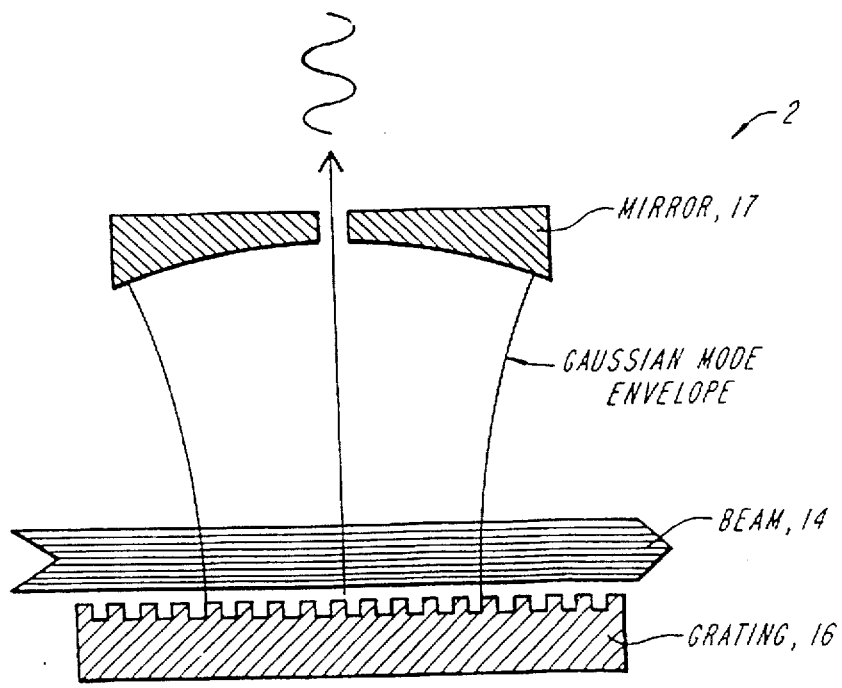
FIG. 2 depicts a normal Orotron.

This principle is utilized in the normal Orotron 2 illustrated in FIG. 2. A beam of electrons 14 moves over the surface of a grating 16. Each electron produces a spontaneous emission spectrum. The total spontaneous emission by the beam may be described as a "shot noise" process. In the normal Orotron, emission from a small range of angles around $\Theta=0$ is coupled onto the beam-grating system by an opposing—i.e., normal—mirror 17. Orotron developers have assumed when the coupling level is sufficient, the stimulated component of the emission process will add energy to the field at the expense of the beam energy. Furthermore, they have assumed the process will continue until nonlinear effects saturate growth. In the normal Orotron, the wavelength, the grating period and the beam velocity are related by $$\lambda = P/n\beta$$

where n is any integer $\geq 1$.

Figure 3A:
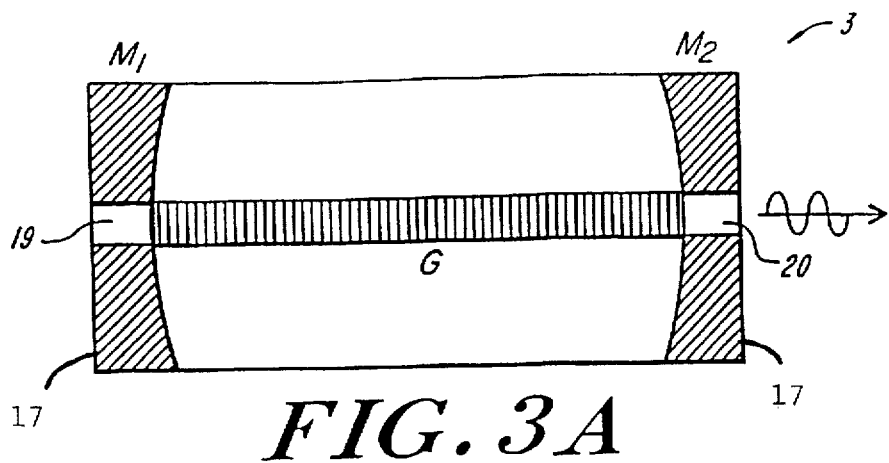
FIGS. 3A and 3B depict a planar Orotron.
Figure 3B:
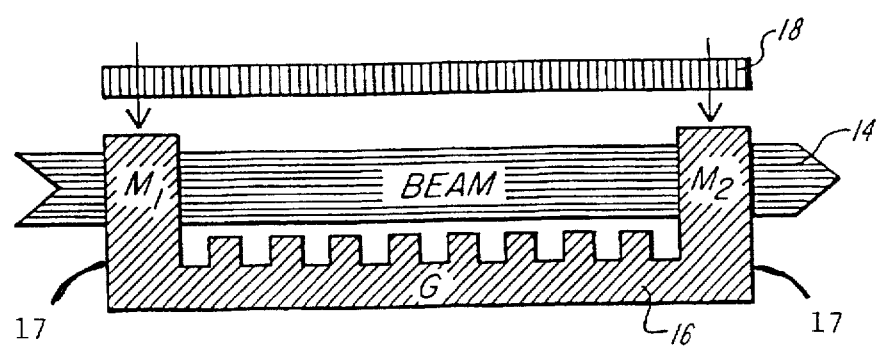

FIGS. 3A and 3B depict a planar Orotron 3. In this device, the spontaneous emission over all angles $\Theta$, for $\{-(\pi)/2 \leq \Theta \leq (\pi)/2\}$ is contained by a plane conductor 18 opposing the planar grating 16. The structure is, in effect, a parallel plate waveguide with open sides. Feedback along an axis coincident with the direction of beam propagation is provided by cylindrical section mirrors M1 and M2. Apertures 19, 20 in the mirrors M1, M2 provide access and exit apertures for the beam, and radiation is also extracted through the beam exit aperture 20. The planar Orotron effectively employs a wider range of emission angles than the normal Orotron, and thus it has a greater electronic tuning range.

Figure 4A:
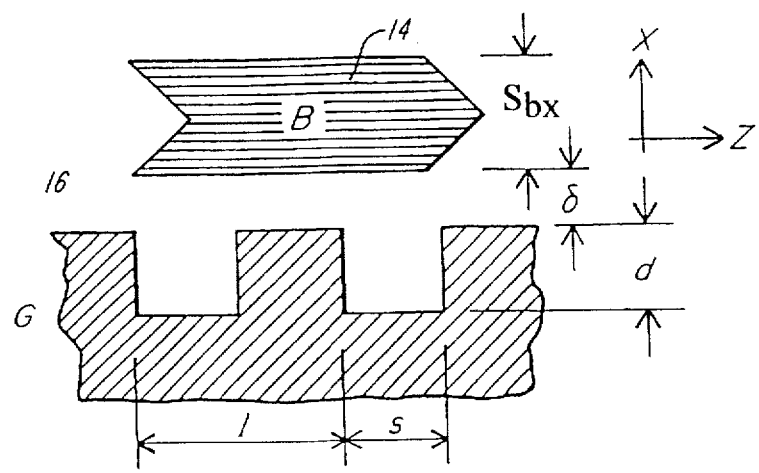
FIGS. 4A, 4B, and 4C depict a grating coupled oscillators (GCO) for practice of the invention; 4A shows the relationship between the beam and grating.

FIG. 4A depicts the relation of the beam and grating in a grating coupled oscillator for a practice of the invention. A beam 14, having thickness $S_{bx}$ in the direction normal to the grating 16, moves over the grating 16 at near-grazing incidence. The beam-grating gap $\delta$ should be smaller than $S_{bx}$, and in some instances, it may also be small in comparison with the grating period P.

Figure 4B:
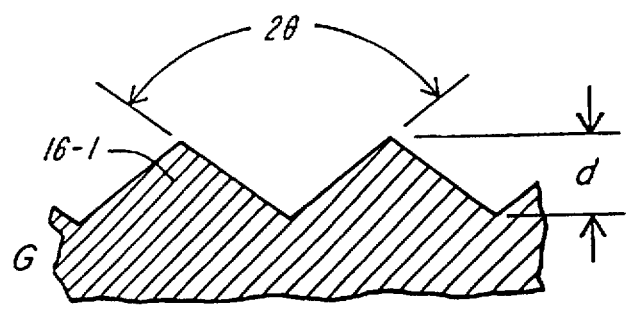
Figure 4C:
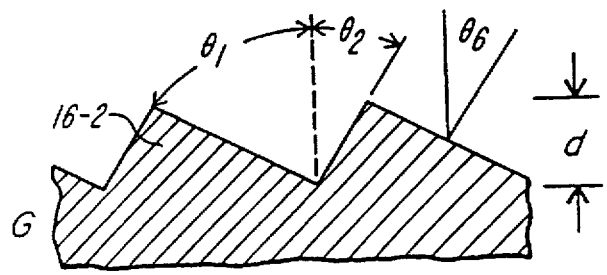

Three typical grating profiles 16, 16.1, and 16.2, are shown in FIGS. 4A, 4B, and 4C. The typical grating profiles of 16, 16.1, and 16.2 can be described as rectangular, equilateral triangular, and non-equilateral triangular or blazed, respectively. The scale of the wavelength of the emitted radiation is controlled by the grating period alone, but the coupling strength and feedback structures that are effective in a given instance are dependent upon the grating profile.

Figure 5:
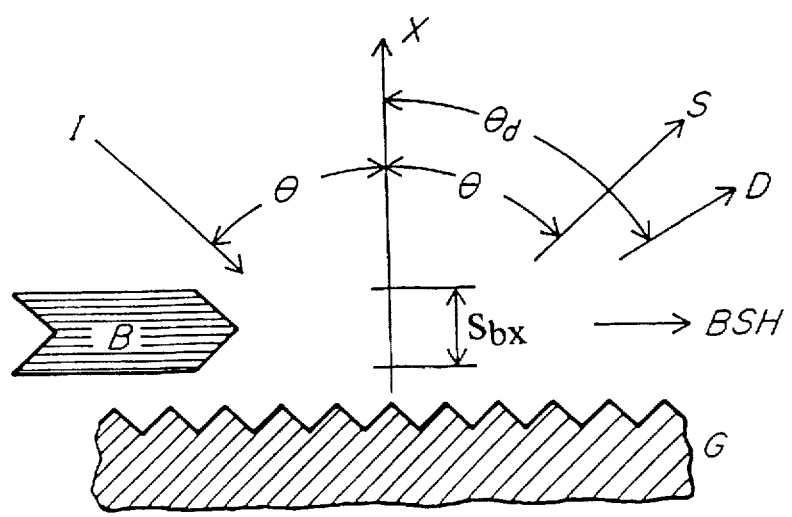
FIG. 5 depicts decomposition of the fields above a grating as depicted in FIG. 4B.

FIG. 5 depicts the decomposition of the fields above a grating as shown in FIG. 4B. The fields above the grating may be generally decomposed into four major components: incident waves (I), specular components (S), diffracted components (D) of a reflected wave and an infinite set of periodic bound space harmonics (BSH). Thus, the radiative components exist together with a set of periodic space harmonics produced by the modulation of the grating period, while the reflected wave is divided into specular (S) and diffracted (D) components. The periodic space harmonics result from the periodic boundary conditions on the grating surface. The phase velocity of each bound space harmonic is less than the speed of light and thus they may be velocity-matched to the electron beam.

In some configurations, the incident wave intensity may be zero. In such a circumstance, the outgoing wave is produced entirely by the electron beam moving over the surface. Other resonator/coupler configurations may employ both incoming and outgoing radiative wave components.

Dispersion

A single electromagnetic mode of the grating is identified by its angular frequency $\omega$ and the infinite set of wave numbers $$K_m = K_o + 2m(\pi)/P$$

where $\{(\text{infinity}) \leq m \leq (\text{infinity})\}$. The axial wave numbers $K_m$ characterize the propagation of the wave along the surface. Each integer m (including m=0) is associated uniquely with a space harmonic and each space harmonic has a unique phase velocity $\beta_p$ expressed by the following equation:

$$\beta_p = \omega/cK_m$$

However, all space harmonics have the same group velocity, and thus the wave does not change its overall shape as it moves along the surface. When $$K_m > \omega/c$$

the associated space harmonic is bound to the surface and in most cases of practical interest only $K_o$ may violate this condition. If $$K_o < \omega/c$$

then radiative components are present in the wave, and the operation of various GCO configurations can be improved when these components are contained by additional optical components. In some cases, higher order harmonics can be radiative. Thus, one can arrange the device so that these radiative higher order harmonics produce the output radiation of the device.

Further understanding of GCO operation may be obtained by considering the dispersion relation satisfied by the grating modes. This function, which relates $\omega$ and $K_m$, is a consistency condition imposed by matching the solutions of Maxwell's equations with the boundary conditions on the surface.

Figure 6:
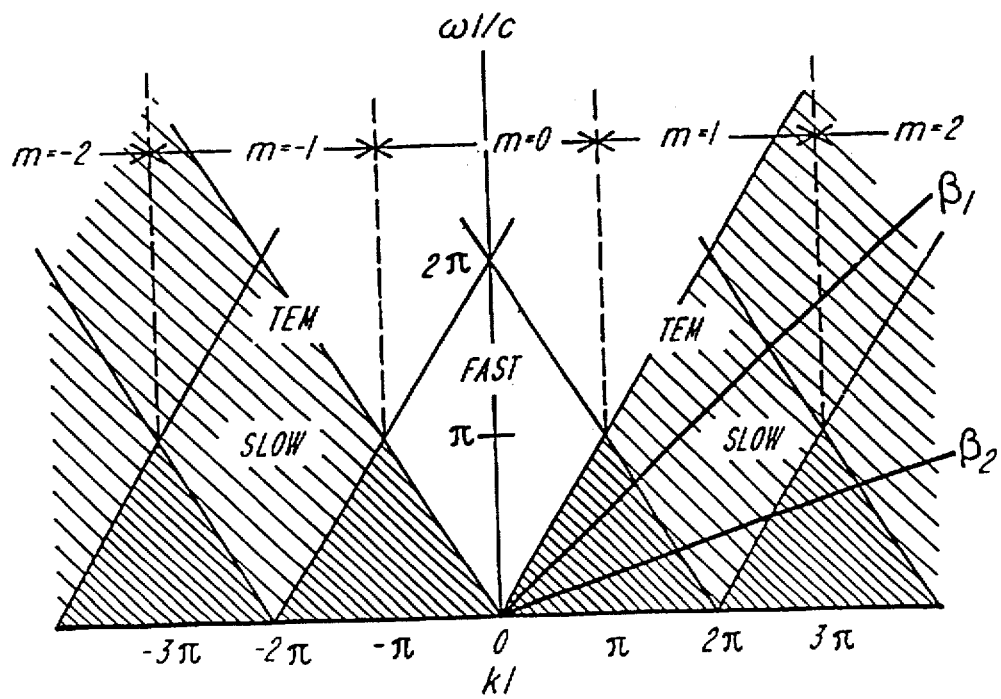
FIG. 6 depicts the dispersion plane for a GCO constructed in accord with the invention.

It may be expressed symbolically in the form:

$$D[\omega P/c, K_m P, d/P, s/P] = 0$$

and in general it will have many branches, as indicated in FIG. 6. The particular form selected for this equation emphasizes the universal and self-similar properties of D. If all dimensions are changed in the same proportion as grating period P, then D remains invariant. Further, it is also obvious that the frequency and wavenumber of a particular mode will vary inversely in proportion with the period. The choice of variables d (slot depth), and s (slot width) which appear in the equation are appropriate when a rectangular grating profile is employed. Suitable modifications for other profiles and boundary conditions are obvious. The universal and self-similar nature of D is an important tool in GCO design.

FIG. 6 depicts the dispersion plane $\omega P/c$–KP for a GCO for a practice of the invention. The plane is divided into regions in which the phase velocity of the fundamental wave component (m=0) is either fast or slow with respect to the speed of light. Boundaries of this region are defined by the TEM dispersion relation of the "light lines":

$$\omega P/c = \pm KP$$

Regions in which $\omega P/c < KP$ (slow-wave regions) are shaded in FIG. 6. Periodic replications of the light lines are also shown in FIG. 6. The first intersection of this periodic array of lines form a set of triangular regions which are more heavily cross-hatched. Branches of the dispersion relation defined by D=0 which lie within these regions, will have no space harmonic components with a phase velocity greater than the speed of light. Hence they are non-radiative. These branches could also be used to form a single-element GCO resonator. Branches of D=0 which fall outside of the heavily cross-hatched triangles have at least one fast wave component.

A beam line defined by $$\beta = \omega 1/cKP$$

is also shown in FIG. 6. Since β is the relative velocity of a beam electron, it is necessarily less than unity. At points where β intersects branches of D=0, resonant coupling with the wave can be effected. These intersections may occur with any part of the slow wave portion of the first quadrant of the (ωP/c–KP) plane.

Tuning

An additional set of constraints are imposed when an electron beam is included in the analysis. The beam moves over the surface at grazing incidence and couples with slow space harmonics. These are the components of the wave which have phase velocity (ω/K) less than the speed of light and which are thus bound to the surface (i.e., they are non-radiative).

The interaction strength of the electron beam with a spatial mode peaks near points where the beam velocity v (or β=v/c,c=the speed of light) is approximately equal to the phase velocities (ω/K). Stated explicitly, the velocity match condition takes the form $$\omega = cK\beta$$

When used together with the dispersion relations, this equation defines the tuning relation as follows:

$$D_T[\omega P/c, \omega P/c\beta, d/P, s/P] = 0$$

Trajectories defined by this equation can be plotted as a function of the relative kinetic energy of a beam electron, (Y–1), where:

$$Y = 1/(1-\beta^2)^{0.5},$$

$$Y - 1 = eV_b/mc^2;$$

and where e is the charge on the electron, $V_b$ is the voltage of the beam electrons, and m is the rest mass of the electron. The trajectories calculated as functions of (Y-1) are in one to one correspondence with the dispersion relations. The tuning function associated with the dispersion relations displayed on FIG. 6 are shown on FIG. 7C. Since operation points are defined by the intersections of the "beam line" defined above with the trajectories on the [ωP/c-KP] dispersion plane, many potential operating points, which can be used in various embodiments, have been found.

Coupling

The relation between the beam and phase velocities may also be used to define two useful dimensionless coupling constants. Each space harmonic component separately satisfies Maxwell's equations. The boundary conditions of the grating in turn link the various space harmonic amplitudes. In the triangular region of the dispersion plane defined by $$KP > \omega P/c$$

the transverse wavenumber has the form:

$$q = (K^2 - \omega^2/c^2)^{0.5}$$

The variable q characterizes the spatial variation of a slow space harmonic in the direction normal to the plane of the grating. In general, the space harmonic amplitude is greatest near the grating surface and diminishes with distance above the grating. Hence, $q^{-1}$ in cm is a measure of the spatial extent of a given space harmonic. Combining this equation with the beam gap, δ, and the beam thickness, $S_{bx}$, defines two dimensionless coupling constants:

$$u(\delta) = 2q\delta$$

$$u(S_{bx}) = 2qS_{bx}$$

These equations are measures of the degree of evanescence of the space harmonic over the gap and over a beam thickness, respectively. Invoking the velocity matching condition and the usual relation between the free-space wavelength λ and the angular frequency ω can be used to convert the evanescence equations into the more intuitive forms:

$$u(\delta) = 4(\pi)\delta/\lambda\beta Y$$

$$u(S_{bx}) = 4(\pi)S_{bx}/\lambda\beta Y$$

In general, it is possible by beam steering, to minimize the gap δ such that the gap is much less than wavelength; i.e., δ<<λ. The beam thickness, however, can not be made arbitrarily small. Thus, the latter equation represents a fundamental design formula relating the dimensionless evanescence scale (u), the operating wavelength, and the beam thickness to the beam kinematic parameters (βY):

$$u\lambda/S_{bx} = 4(\pi)\beta Y$$

The magnitude of the right-hand side of this equation is fixed by the relative kinetic energy of a beam electron (Y–1). When Y–1 is small, much less than 1, the operating wavelength will be much greater than the beam thickness (u is typically set between 2 and 4). Short-wavelength operation in this case may be achieved with microscopic beams of the type produced by very-high-brightness field emission cathodes. Alternatively, beam generators of the higher energy typical of those used in microwave tubes with Watt to kilowatt power output levels (but still with Y–1<1) could be used. Beam thickness can then be increased relative to the wavelength. It is also possible to adapt a beam produced by any high-energy accelerator (Y–1>1) to the task of driving a GCO structure. In this case, operation with $\lambda < S_{bx}$ may be achieved. Each alternative beam generator may offer distinct advantages in certain applications, as discussed in connection with the embodiments depicted in FIGS. 7 and 8.

Figure 7B:
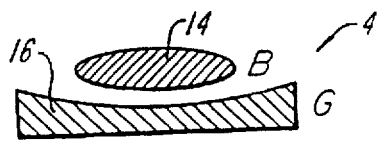
FIGS. 7A, 7B and 7C depict a single-optical-element grating-coupled oscillator with cylindrical grating section and associated dispersion plane.
Figure 7A:
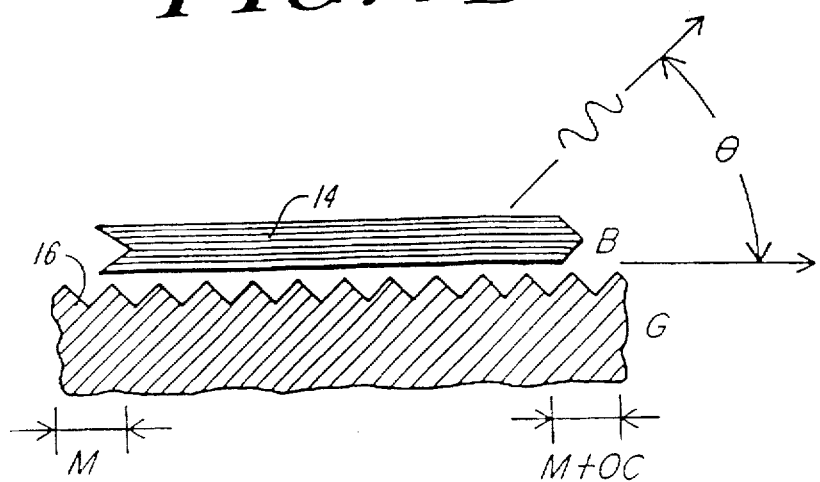
Figure 7C:
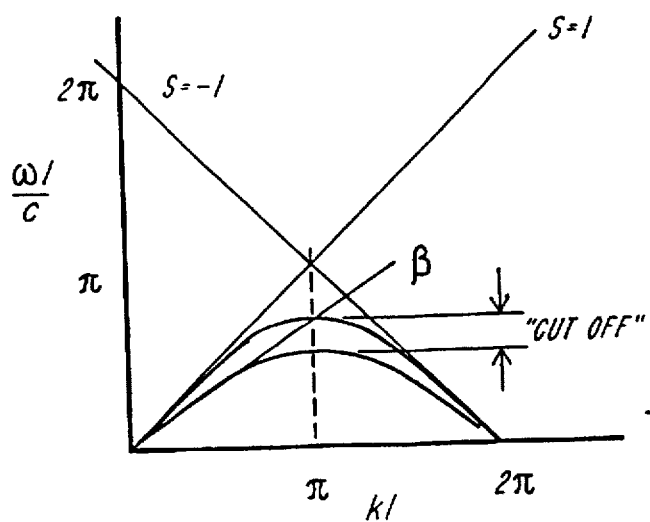

FIGS. 7A and 7B depict a single-optical-element grating coupled oscillator 4 for a proposed practice of the invention, in which all essential resonator components are integrated on one optical element. The electron beam 14 moves over the grating 16 and excites the bound (non-radiative) surface wave. FIG. 7C depicts the relevant portion of the dispersion plane corresponding to the GCO of FIGS. 7A and 7B. The beam having velocity β intercepts a branch of D=0 within the non-radiative zone at a point near KP=(π). Wavelengths in a region around $$\lambda = 2P/\beta$$

may be produced. Since the wave is non-radiative, it will experience an "open-circuit" reflection at the ends of the grating. The overall round-trip resonator phase condition may be expressed in terms of the forward ($K_{of}$) and backward ($K_{ob}$) fundamental zone wave numbers $$(K_{of} + K_{ob})L = 2N(\pi)$$

where N is an integer.

If needed or desired, additional reflection can be obtained by increasing the modulation depth on the grating or by adding external mirrors. As illustrated in FIG. 7C, this has the effect of moving the operating frequency into a "cutoff" zone of the dispersion plane. Output coupling can be similarly effected by decreasing the modulation depth to zero over a small section near the end portion of the grating. In the single-element radiator, containment of the wave in the transverse direction can be assisted by curving the grating surface along the direction perpendicular to the axis of beam propagation, as indicated in FIG. 7B. However, a flat grating surface has been used to attain a working oscillator.

Figure 8B:
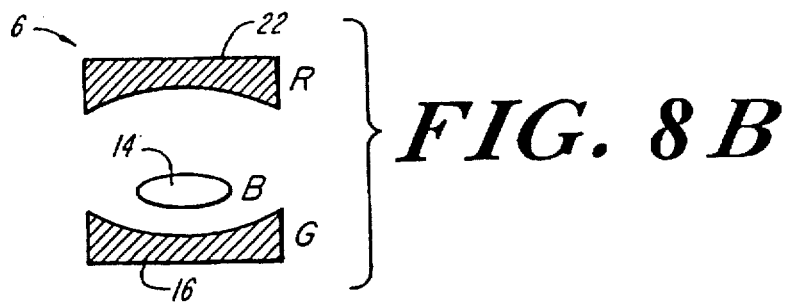
FIGS. 8A, 8B and 8C depict a parallel trough guide resonator.
Figure 8A:
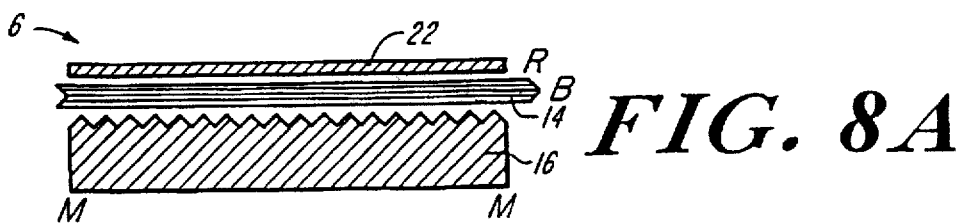
Figure 8C:
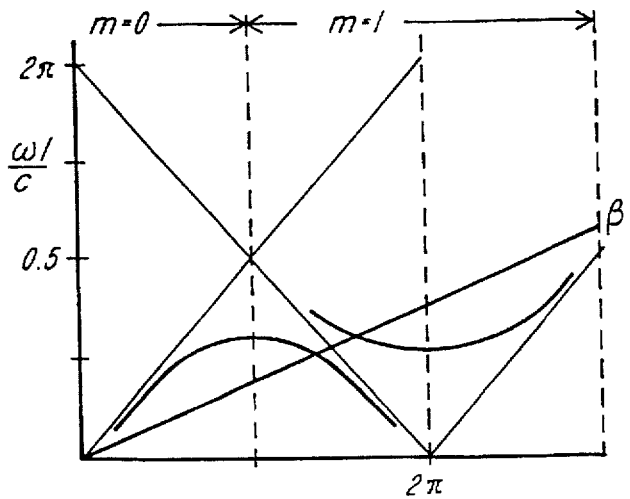

FIGS. 8A–8C depict a parallel trough guide resonator 6, formed by a pair of opposing trough surfaces 16, 22, one of which includes an embedded grating 16. The relevant portions of the dispersion plane are also illustrated in FIG. 8C. Again, it is known to drive the modes in the non-radiative zone. However, in accord with a feature of this invention, it has further been found that access to any point on the plane where $$KP > \omega P/c$$

is achievable. As in the open resonator, feedback in the non-radiative zone can be provided by the open circuit reflection, by additional increase in the modulation depth, or by end mirrors.

In view of the embodiments illustrated in FIGS. 2–8 together with the foregoing teachings, those skilled in the art will appreciate that the grating-loaded, open, or quasi-optical resonator, is a flexible means of effecting beam coupling. It is particularly useful when operation at submillimeter and FIR wavelengths is desired. Moreover, the concepts apply to even shorter wavelengths from the FIR down to the ultraviolet. Operation at shorter infrared and visible wavelengths follow from certain system improvements. These improvements include lower electron beam emmitance, higher electron beam current density, and improved optical quality of the grating.

EXAMPLE 1

Figure 10:
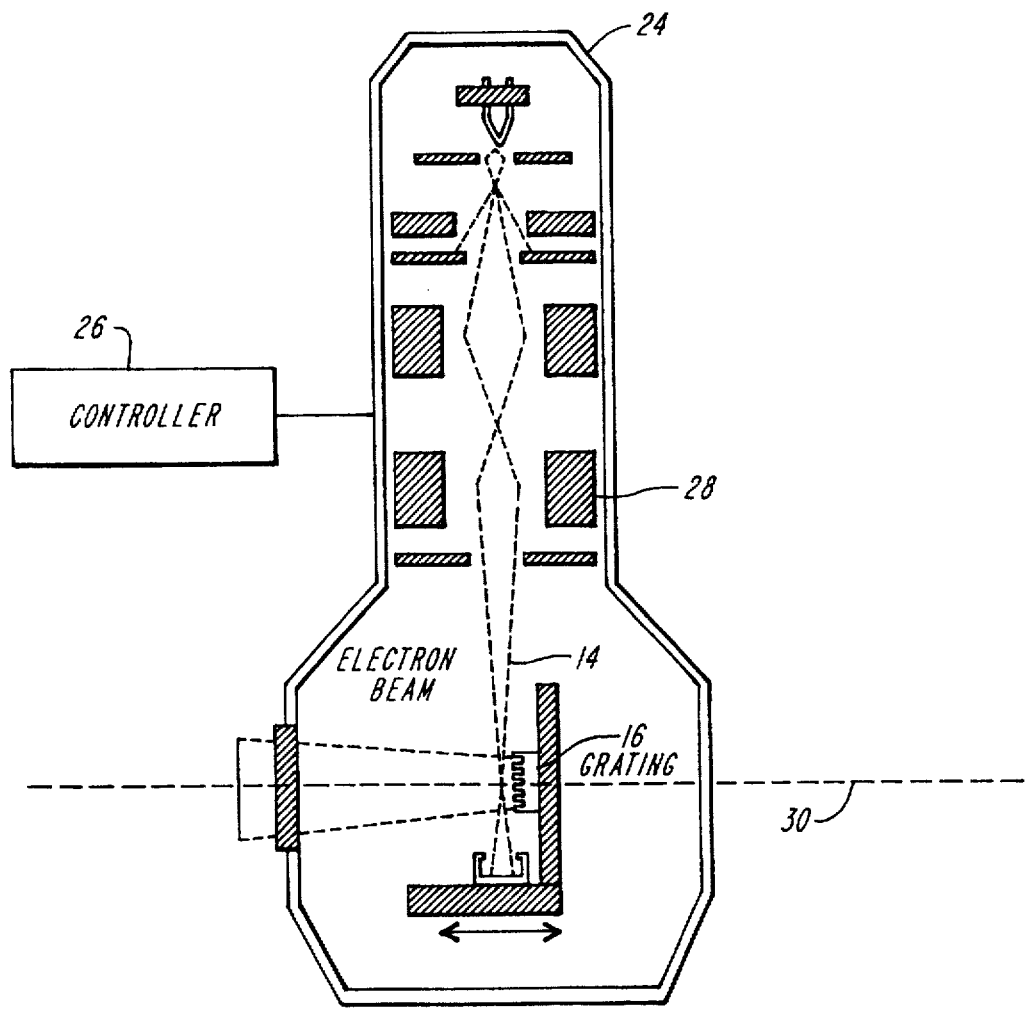
FIG. 10 depicts a schematic embodiment of a Smith-Purcell free-electron laser for a practice of the invention.

FIG. 10 is a schematic depiction of one embodiment of the invention. As shown in FIG. 10, an electron beam from a modified scanning electron microscope was passed over a diffraction grating to produce Smith-Purcell radiation. The equipment included a source 24, with a controller 26. The source produced an electron beam 14 having a beam current controlled by controller 26. Electron optical lenses 28 focused the electron beam. This focusing of the electron beam is analogous to what occurs in a typical scanning electron microscope. Importantly, a guiding magnetic field did not constrain the beam. The beam voltage was 35 KeV. The electron beam diameter was about 30 μm. End-mirrors 17 as depicted in FIGS. 3A and 3B provided additional feedback of bound modes of the electromagnetic field.

Figure 9:
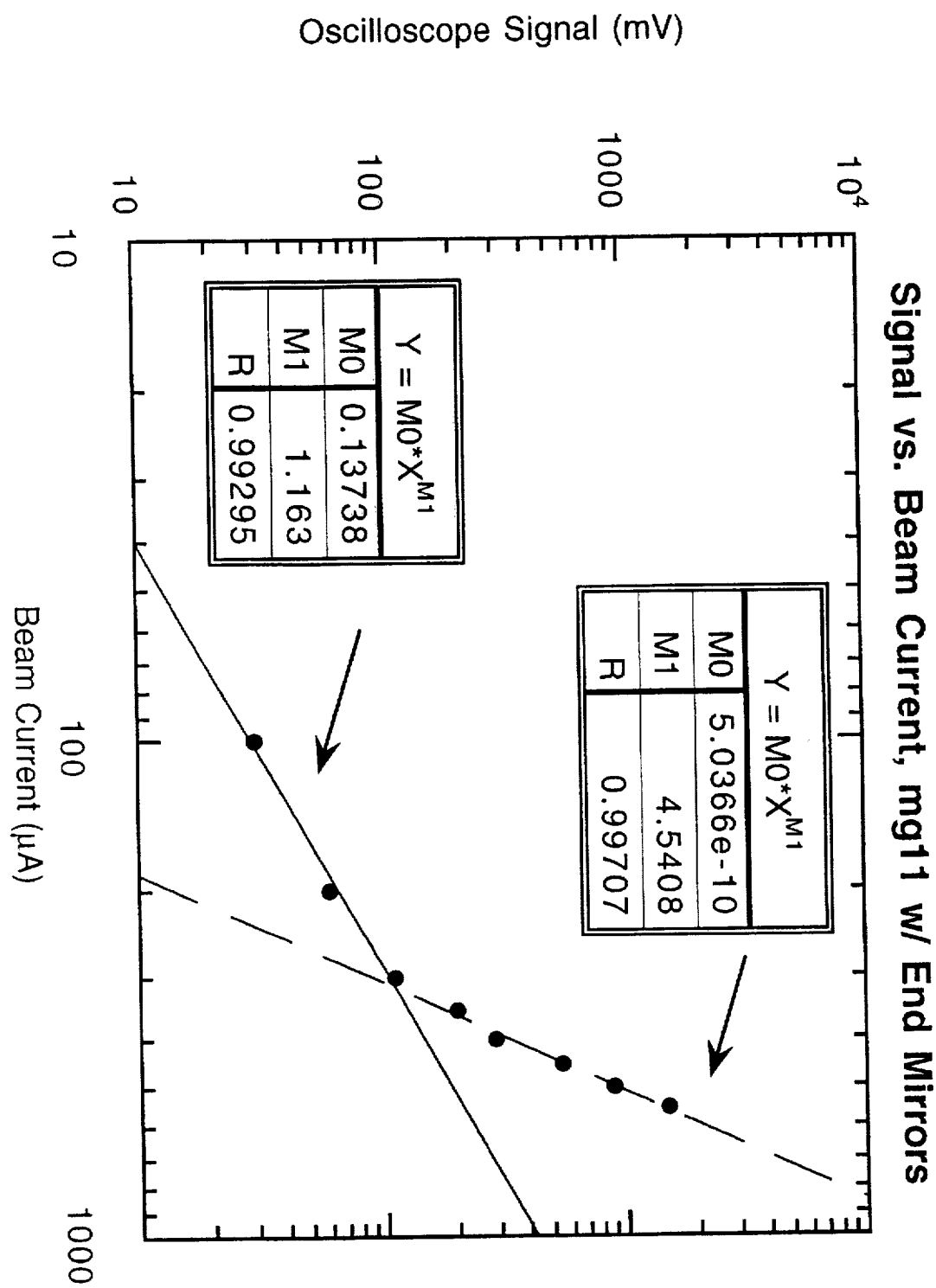
FIG. 9 depicts the output power as a function of the input beam current of the free-electron laser for a particular embodiment of the invention.

FIG. 9, which is a graph of output power as a function of input beam current measured using the parameters described above, indicates that the foregoing understanding is valid. As the beam current was increased from about 50 μA to about 400 μA, the output rose linearly, until, when the beam current achieved a critical value, in the range of about 250 μA to about 350 μA, the output power went up sharply rising proportional to the beam current to the 4.5 power, i.e. output power~$I_b^{4.5}$.

The system of FIG. 10 has been shown to oscillate with sufficient beam current density. More particularly, as the beam current density is increased past a critical current density, the feedback of bound modes of the electromagnetic field becomes sufficient to cause the system to oscillate. Note that it is the radiated energy directed out of the plane of the diffraction grating (the plane of the grating is perpendicular to axis 30) that is being detected as the output power, not bound surface mode energy.

EXAMPLE 2

Example 1 above used end-mirrors 17 as depicted in FIGS. 3A and 3B. To verify that the system oscillates without mirrors providing feedback, the foregoing example was repeated, albeit without the mirrors or other added feedback elements. The threshold for oscillation was again observed by sufficiently increasing the beam current, and correspondingly the current density.

The device and method according to the invention are novel both with and without mirrors. It is a significant confirmation of a free electron laser based on the Smith Purcell effect. The results show that the device and method of the invention achieve oscillation by virtue of distributed feedback of bound surface modes, provided by the grating itself if the current density is sufficiently high. Feedback occurs, at least in part, at the discontinuity provided by the edge of the grating. Without mirrors, the system is both a single element resonator and a free electron laser.

It is further understood that the lasing effect is enhanced and can be further controlled by the addition of end mirrors that alter the reflection of the bound modes at the ends of the grating. The lasing effect can also be enhanced and further controlled by the addition of mirrors, e.g. mirror 17 in FIG. 2, to reflect partially the output radiated mode of interest.

In one preferred embodiment of the invention as disclosed in example 1, the electron beam has a beam energy in the range of about 10 KeV to about 50 KeV, and a beam diameter in the range of about 10 μm to about 50 μm.

It will thus be seen that the invention efficiently attains the objects set forth above, among those made apparent from the preceding description.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. Free-electron laser apparatus for generating coherent stimulated electromagnetic radiation, said laser apparatus comprising a source of a beam of electrons, diffraction grating means, means for directing a beam of electrons along a path extending over said grating means so that said beam interacts with said grating to produce interaction electromagnetic radiation, at least a first mode of said interaction electromagnetic radiation being directed along a selected axis substantially parallel to said path of said beam, resonator means for providing feedback of at least said first mode of said interaction electromagnetic radiation, and means for controlling the current of the beam of electrons for selectively increasing the current at least up to a feedback beam current level to provide feedback from said resonator means of at least said first mode of said interaction electromagnetic radiation for achieving said stimulated radiation.

2. Apparatus according to claim 1, wherein said resonator means includes said diffraction grating means so that said diffraction grating means provides said feedback.

3. Apparatus according to claim 1, wherein said diffraction grating means comprises a diffraction grating element that is substantially planar.

4. Apparatus according to claim 1, wherein said grating means comprises a diffraction grating element having a substantially cylindrical cross section over at least a portion of said element, the axis of said cylindrical cross section being substantially parallel to said beam.

5. Apparatus according to claim 1, wherein said feedback beam current level is substantially between 1 and 10,000 mA with a beam diameter of about 10 μm to about 50 μm.

6. Apparatus according to claim 1, wherein said feedback beam current level is substantially between 10 and 1,000 mA with a beam diameter of about 10 μm to about 50 μm.

7. Apparatus according to claim 1, wherein said feedback beam current level is substantially between 50 and 500 mA with a beam diameter of about 10 μm to about 50 μm.

8. Apparatus according to claim 1, wherein said electron beam is focused by at least one electron optical lens.

9. Apparatus according to claim 1, wherein said electron beam has a beam energy in the range of about 10 keV to about 50 keV.

10. Apparatus according to claim 1, wherein said electron beam has a beam diameter in the range of about 10 μm to about 50 μm.

11. Apparatus according to claim 1, wherein said resonator means comprises first and second mirror elements, the axis of said first mirror element and the axis of said second mirror element being in optical alignment with said first mode of said interaction electromagnetic radiation, said mirror elements providing said feedback of said interaction electromagnetic radiation.

12. Apparatus according to claim 11, wherein at least one of said mirror elements is substantially cylindrical.

13. Apparatus according to claim 1, wherein said resonator further comprises a plurality of mirror elements, said mirror elements being disposed out of the plane of said diffraction grating means and in selected proximity to said diffraction grating means so as to provide feedback of a radiated mode of said interaction electromagnetic radiation.

14. Apparatus according to claim 1, wherein said diffraction grating means comprises a diffraction grating element with a selected profile so as to achieve desired feedback of said interaction electromagnetic interaction, said profile existing in a plane that is perpendicular to the plane of said grating and parallel to said path of said electron beam.

15. Apparatus according to claim 14, wherein said selected profile is either rectangular, equilateral triangular, or non-equilateral triangular.

16. A free-electron laser process for generating coherent stimulated electromagnetic radiation, said process having the improvement comprising the steps of passing a beam of electrons along a path extending over a diffraction grating element to produce interaction electromagnetic radiation, at least a first mode of said interaction electromagnetic radiation being directed along a selected axis substantially parallel to the path of said beam, providing feedback of at least said first mode of said interaction electromagnetic radiation, and controlling the current of the beam of electrons for selectively increasing the current at least up to a feedback beam current level to provide feedback from a resonator element of at least said first mode of said interaction electromagnetic radiation for achieving said stimulated radiation.

17. A process as recited in claim 16, wherein said feedback beam current level is substantially between 1 and 10,000 mA with a beam diameter of about 10 μm to about 50 μm.

18. A process as recited in claim 16, wherein said feedback beam current level is substantially between 10 and 1,000 mA with a beam diameter of about 10 μm to about 50 μm.

19. A process as recited in claim 16, wherein said feedback beam current level is substantially between 50 and 500 mA with a beam diameter of about 10 μm to about 50 μm.

20. A process as recited in claim 16, wherein said step of providing said feedback includes providing first and second mirror elements, the axis of said first mirror element and the axis of said second mirror element being in optical alignment with said first mode of said interaction electromagnetic radiation.

21. A process as recited in claim 16, wherein said step of providing said feedback includes providing said diffraction grating element with a selected profile, said selected profile existing in a plane that is perpendicular to the plane of said grating and parallel to said path of said electron beam.

22. A process as recited in claim 21, wherein said step of providing said diffraction grating element includes providing said diffraction grating element with a profile that is either rectangular, equilateral triangular, or non-equilateral triangular.

* * * * *